H. PRIES, DEC'D.
A. PRIES, EXECUTRIX.
DRAFT GEAR.
APPLICATION FILED MAR. 7, 1912.
1,178,677.
Patented Apr. 11, 1916.
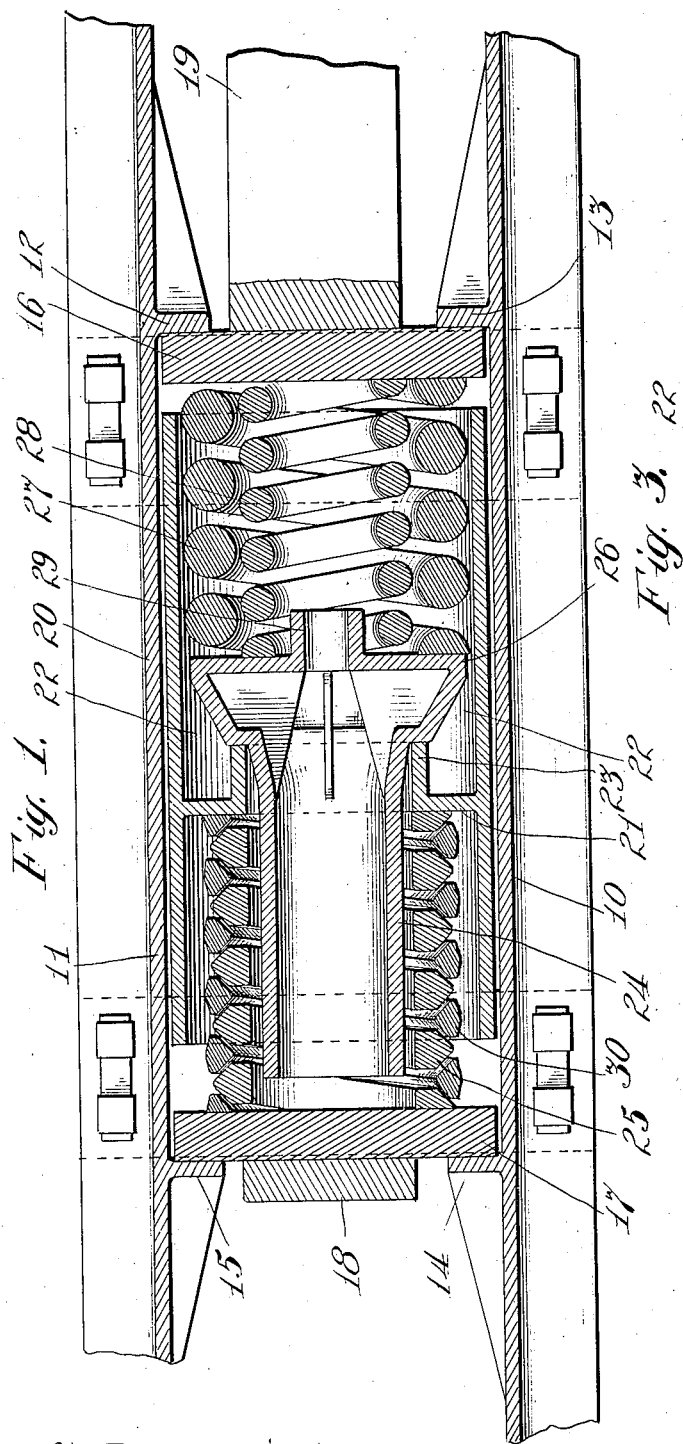
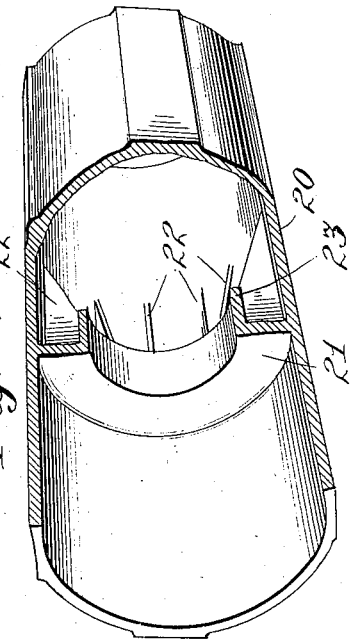
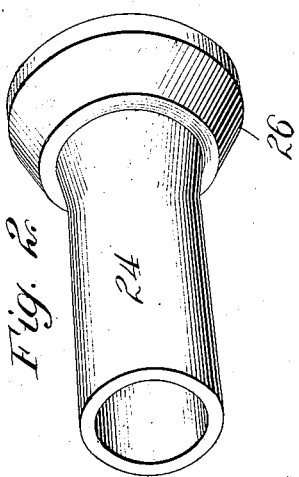
Witnesses
Inventor
Herman Pries.
By Gilson & Gilson
Attorneys

UNITED STATES PATENT OFFICE.

HERMAN PRIES, OF MICHIGAN CITY, INDIANA; AMELIA PRIES EXECUTRIX OF SAID HERMAN PRIES, DECEASED.

DRAFT-GEAR.

1,178,677.   Specification of Letters Patent.   Patented Apr. 11, 1916.

Application filed March 7, 1912. Serial No. 682,328.

*To all whom it may concern:*

Be it known that I, HERMAN PRIES, a citizen of the United States, and resident of Michigan City, county of Laporte, and State of Indiana, have invented certain new and useful Improvements in Draft-Gear, of which the following is a specification, and which are illustrated in the accompanying drawings, forming a part thereof.

The invention relates to draft gear in which provision is made for absorbing the shocks in part by means of friction, there being used for this purpose a pair of helical springs one coiled about the other, its several turns lying between the turns of the inner spring, the friction being developed by the engagement of the two springs as they are compressed.

The object of the invention is to provide an initial spring resistance for taking care of the lighter shocks, and an improved form of housing for gears of the type named.

It consists in combining with the friction springs one or a pair of springs of less tension, and a housing which is advanced under the influence of the heavier shocks and is so arranged as to compress the frictional springs.

In the accompanying drawings—Figure 1 is a longitudinal plan section of the draft mechanism; Fig. 2 is a detail in perspective of a plunger used in the gear; and Fig. 3 is a detail in perspective, partly in section, of the gear housing.

A pair of cheek plates are shown at 10 and 11, each being provided with a forward draft lug 12, 13, and a rearward draft lug 14, 15. Ordinary plate followers 16, 17, coöperate with these lugs, and are encircled by the yoke 18 connected with the coupler bar 19. A cylindrical shell 20, of less length than the normal distance between the followers 16, 17, forms the housing for the spring and friction mechanism, and is provided with an instanding abutment, preferably taking the form of an annular flange 21 intermediate of its ends, strengthened by radially disposed webs 22 and having at its inner edge an annular flange 23 forming a shoulder or bearing for the plunger 24 against which the springs react.

The plunger 24 is hollow and cylindrical in form, playing through and guided by the instanding flange 21, its stem projecting backwardly and forming a guide for the inner friction spring 25. The forward end of the plunger is enlarged to form a head 25, which seats against the forward end of the flange 23 and forms a bearing for the forward or cushioning springs 27, 28, which, as shown, are nested together, a boss 29, extending forwardly from the center of the head 26, serving to center these springs.

The springs 27, 28 react between the head 26 and the forward follower 16, and the spring 25 reacts between the flange 21 and the rearward follower 17. An outer friction spring 30 is coiled about the spring 25, fitting into the interstices between its coils, the meeting faces of the several coils of the springs 25 and 30 being beveled to form wedging surfaces.

The friction springs 25 and 30 collectively, and by reason of their frictional engagement, are stiffer or more powerful than the springs 27, 28. Under the influence of pulling stresses the rearward follower 17 moves forwardly, the friction springs and shell 20 traveling with it, compressing the springs 27, 28, until the forward end of the shell engages the forward follower 16. The shell being now arrested in its movement, the friction springs 25 and 30 are compressed, and should the movement continue until the follower 17 makes contact with the rearward end of the plunger 24, the springs 27, 28, are further compressed by its advance relatively to the shell. Upon the recoil the parts are returned to their normal position, the follower 17 moving backwardly to the draft lugs 14, the plunger being returned to its seat upon the flange 23, and further receding under the influence of the springs 27, 28, carries with it the shell.

Under the influence of buffing stresses the follower 16 moves backwardly, compressing the springs 27, 28, until the follower engages the forward end of the shell, the shell being then moved backwardly, compressing the friction springs 25 and 30. The plunger 24 preferably extends beyond the rearward end of the shell 20 when the parts are in the normal position. When under buffing stresses the plunger is arrested by contact with the follower 17, the continued advance of the follower 16 causes a further compression of the springs 27, 28. Upon the recoil the parts are restored to their normal position.

While the friction elements are shown at the rear and the cushioning springs at the forward end of the gear, they may be, if desired, reversed in their positions without changing the action of the device. The length of the shell is such that it will stop the relative approach of the followers before the springs have been completely compressed.

I claim as my invention—

1. In a draft gear, in combination, a pair of followers, a hollow shell having an instanding abutment intermediate of its ends and being of less length than the distance between and being normally out of engagement with the followers adapted for engagement by both, a plunger seated against the abutment and having a stem projecting therebeyond and beyond the end of the shell, cushioning springs reacting between the head of the plunger and the adjacent follower, and friction elements interposed between the abutment and the other follower.

2. In a draft gear, in combination, a pair of followers, a hollow shell having an instanding abutment intermediate of its ends and being of less length than the distance between and being normally out of engagement with the followers adapted for engagement by both, a plunger seated against the abutment and having a stem projecting therebeyond and beyond the end of the shell, cushioning springs reacting between the head of the plunger and the adjacent follower, and a pair of helical springs interposed between the abutment and the other follower, one of such springs being coiled about the other and interfitting and frictionally engaging the several turns thereof.

3. In a draft gear, in combination, a pair of followers, a hollow shell having an instanding abutment intermediate of its ends and being of less length than the distance between and being normally out of engagement with the followers and being adapted for engagement by both, a plunger seated against the abutment and having a stem projecting therebeyond and beyond the end of the shell, shock absorbing elements interposed between each follower and the head of the plunger and the abutment, respectively.

HERMAN PRIES.

Witnesses:
W. ROBINSON,
JNO. W. CARLSON.